US008193477B2

(12) United States Patent
Sherman et al.

(10) Patent No.: US 8,193,477 B2
(45) Date of Patent: Jun. 5, 2012

(54) PERIODIC ALIGNMENT ADJUSTMENT TECHNIQUES FOR TERRESTRIAL SOLAR ARRAYS

(75) Inventors: James Sherman, Hillsborough, NJ (US); Igor Kozin, Princeton, NJ (US)

(73) Assignee: Emcore Solar Power, Inc., Albuquerque, NM (US)

( * ) Notice: Subject to any disclaimer, the term of this patent is extended or adjusted under 35 U.S.C. 154(b) by 461 days.

(21) Appl. No.: 12/468,747

(22) Filed: May 19, 2009

(65) Prior Publication Data
US 2010/0294337 A1   Nov. 25, 2010

(51) Int. Cl.
H01L 31/0232   (2006.01)
H01L 31/042   (2006.01)

(52) U.S. Cl. .............. 250/203.4; 136/244; 136/246; 136/291

(58) Field of Classification Search ............... 250/203.1, 250/203.3, 203.4; 136/206, 243, 244, 252, 136/291, 246
See application file for complete search history.

(56) References Cited

U.S. PATENT DOCUMENTS

| 6,465,725 | B1 * | 10/2002 | Shibata et al. ............ 136/246 |
| 7,381,886 | B1 * | 6/2008 | Aiken et al. ............ 136/246 |
| 7,795,568 | B2 * | 9/2010 | Sherman ............ 250/203.4 |
| 2003/0066555 | A1 * | 4/2003 | Hui et al. ............ 136/246 |
| 2008/0290252 | A1 * | 11/2008 | Leonhardt et al. ......... 250/203.4 |
| 2009/0179139 | A1 * | 7/2009 | Hines et al. ............ 250/203.4 |
| 2010/0023138 | A1 * | 1/2010 | McDonald et al. ............ 700/59 |
| 2010/0101625 | A1 * | 4/2010 | Kats et al. ............ 136/244 |
| 2010/0102200 | A1 * | 4/2010 | Kats et al. ............ 250/203.4 |
| 2010/0102201 | A1 * | 4/2010 | Sherman ............ 250/203.4 |
| 2010/0102202 | A1 * | 4/2010 | Sherman ............ 250/203.4 |
| 2010/0108860 | A1 * | 5/2010 | Sherman et al. ............ 250/203.4 |
| 2010/0294337 | A1 * | 11/2010 | Sherman et al. ............ 136/246 |

* cited by examiner

Primary Examiner — John Lee

(57) ABSTRACT

An automated method causes a terrestrial solar cell array to track the sun. The solar cell system may include motors that adjust a position of the array along different respective axes with respect to the sun. An alignment analysis procedure, e.g., a find sun routine, is performed to ensure that the solar cell system is properly aligned with the sun during solar tracking. This procedure may sweep the solar cell system along determined paths (e.g., azimuth and elevation paths) while measuring an output parameter indicative of system performance. The measured data is analyzed to determine if the solar cell system is in misalignment in which case the solar cell system is moved into proper alignment. The alignment procedure may be implemented on a periodic basis or using triggers, and may be automatically executed or manually executed.

16 Claims, 14 Drawing Sheets

PERIODIC ALIGNMENT ADJUSTMENT TECHNIQUES FOR TERRESTRIAL SOLAR ARRAYS

CROSS-REFERENCE TO RELATED APPLICATIONS

This disclosure is related to co-owned U.S. Pat. No. 7,381,886; patent application Ser. No. 12/024,489 filed on Feb. 1, 2008; U.S. patent application Ser. No. 12/131,556 filed on Jun. 2, 2008; and patent application Ser. No. 12/258,253 filed on Oct. 24, 2008.

TECHNICAL FIELD

This disclosure relates to solar tracking for terrestrial solar cell arrays and more particularly to techniques for finding the sun for solar tracking.

BACKGROUND

In solar tracking systems, generally one or more terrestrial solar cell arrays are used to convert sunlight into electrical energy. Accurate solar tracking is necessary because the amount of power generated by a given solar cell is related to the amount of sunlight that impinges on that cell. In an array of solar cells, it is advantageous to optimize the amount of sunlight that impinges on each constituent solar cell. This optimization is achieved by properly orientating the array relative to the sun and then using motors and actuators to move the array (e.g., in both azimuth and elevation directions) along a predetermined path that properly tracks movement of the sun. Ordinarily, such movement is accurately achieved. However, even with accurate solar tracking models, errors can occur because of limitations in the mechanical elements of the array (i.e., the motors and actuators). Specifically, these elements will degrade over time, due to repetitive grinding of gear parts, unbalanced load forces, shifts in foundation, etc., any of which can result in sagging or twisting that reduces device performance. Furthermore, even when the mechanical elements are functioning properly, seasonal changes can alter how effectively the array tracks the sun. For example, during the summer months when the sun is higher in the sky, the array must be maintained at a more horizontal orientation, in comparison to the winter months when the sun is lower in the sky and array is maintained more vertically. The forces operating against movement of the array, and the resulting likelihood of sagging or twisting, are thus very different at different times of the year. Using the same solar tracking routine at all times would result in seasonal inaccuracies.

SUMMARY

Various aspects of the invention are set forth in the claims.
The details of one or more implementations are set forth in the accompanying drawings and the description below. Various features and advantages will be apparent from the description and drawings, and from the claims.

DETAILED DESCRIPTION

Overview

Figure 1A:
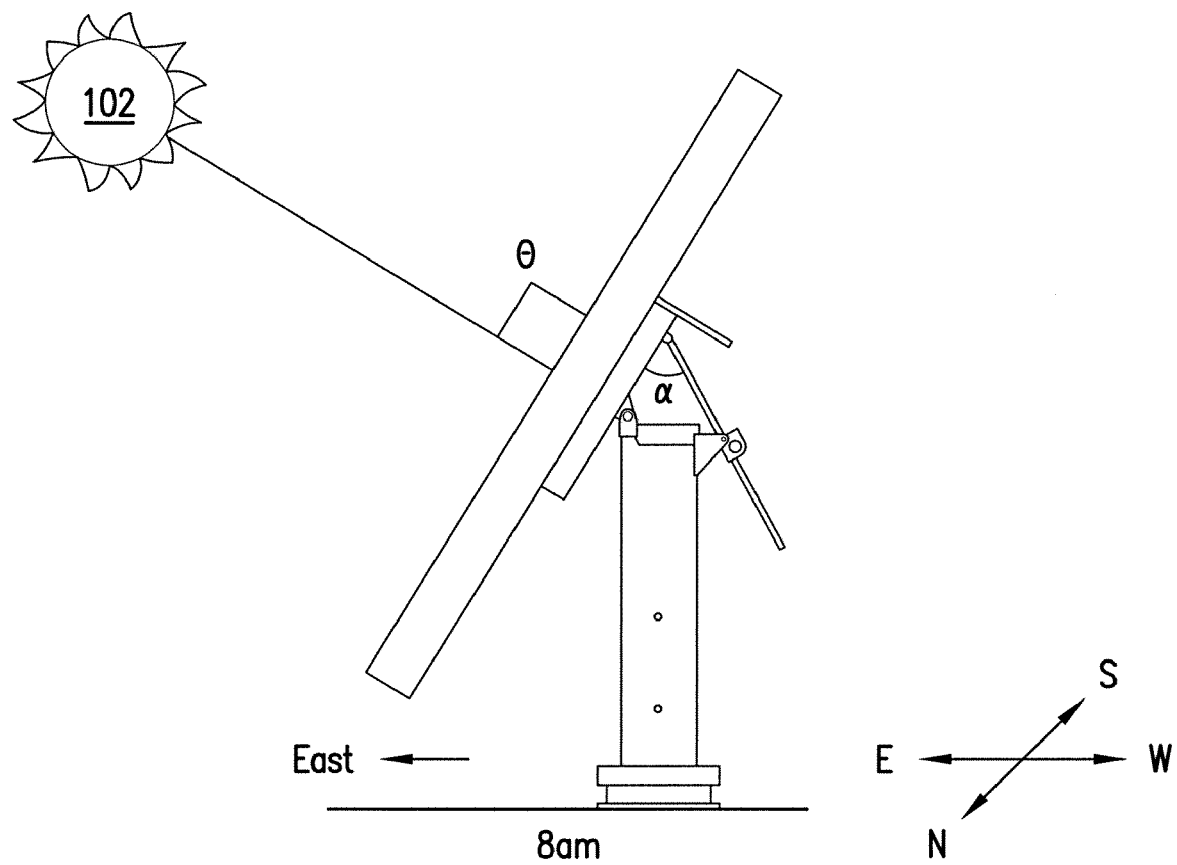
FIGS. 1A, 1B, 1C and 1D are an illustration of a solar cell array tracking the sun during different times of the day.
Figure 1B:
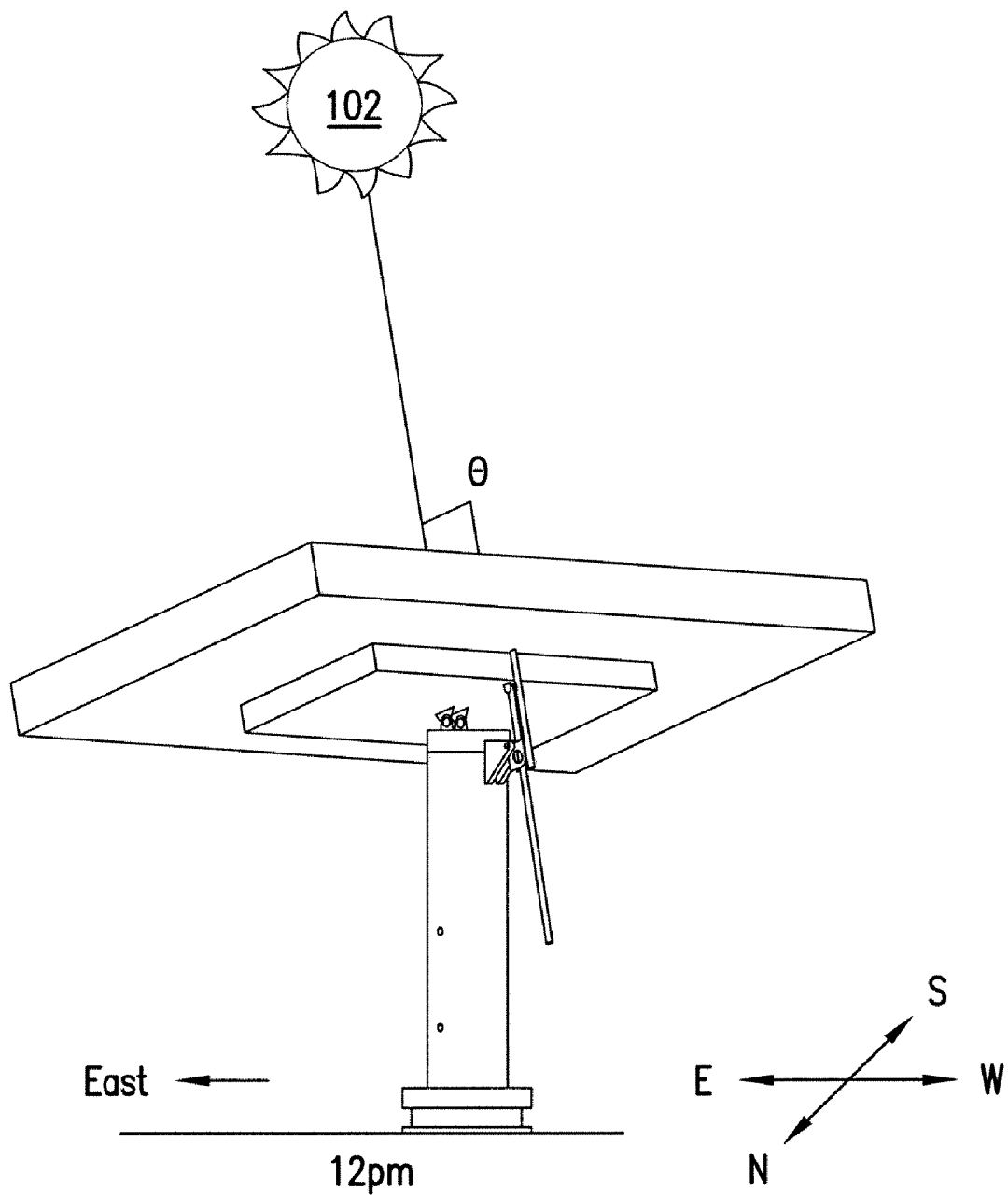
Figure 1C:
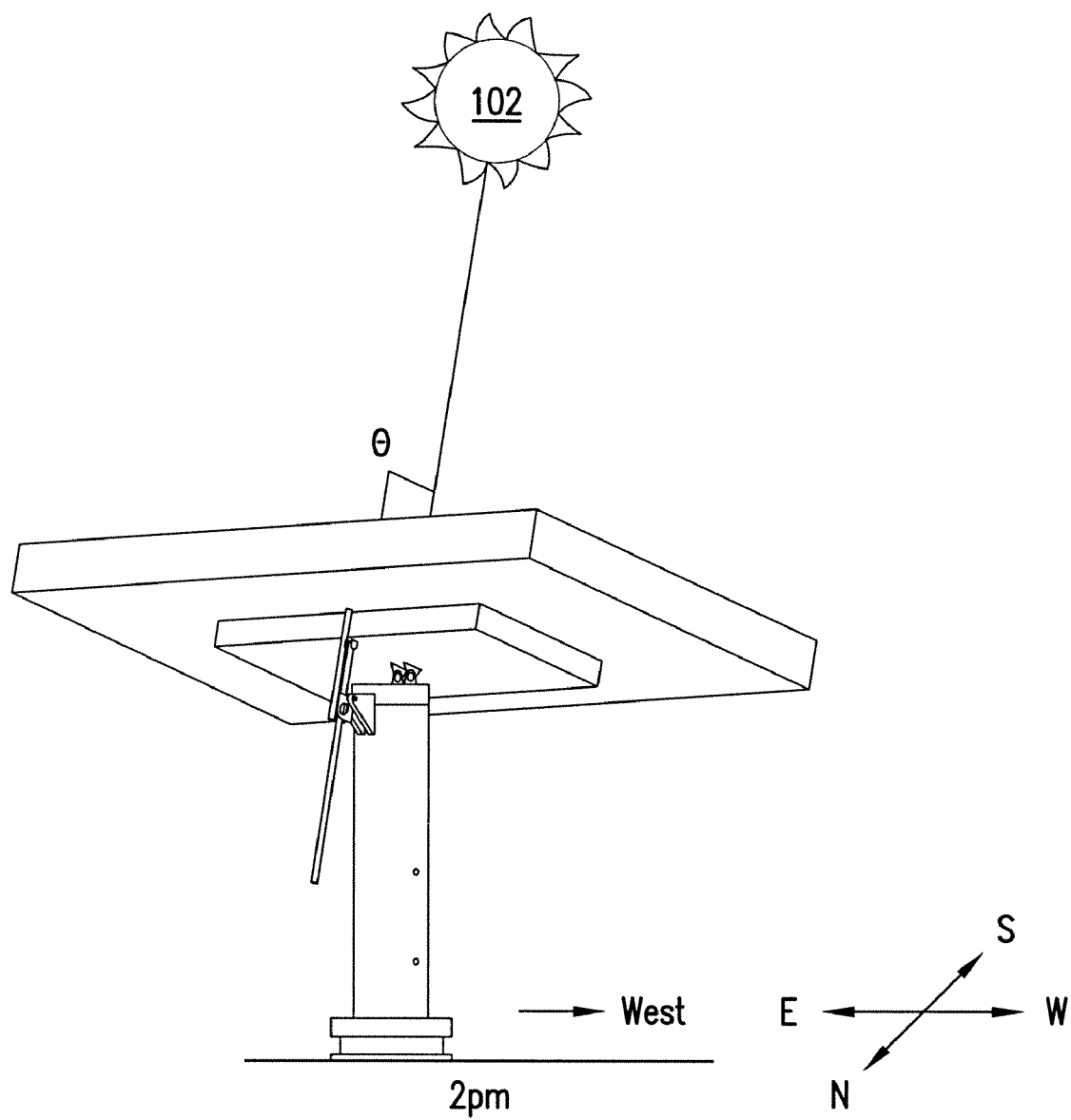
Figure 1D:
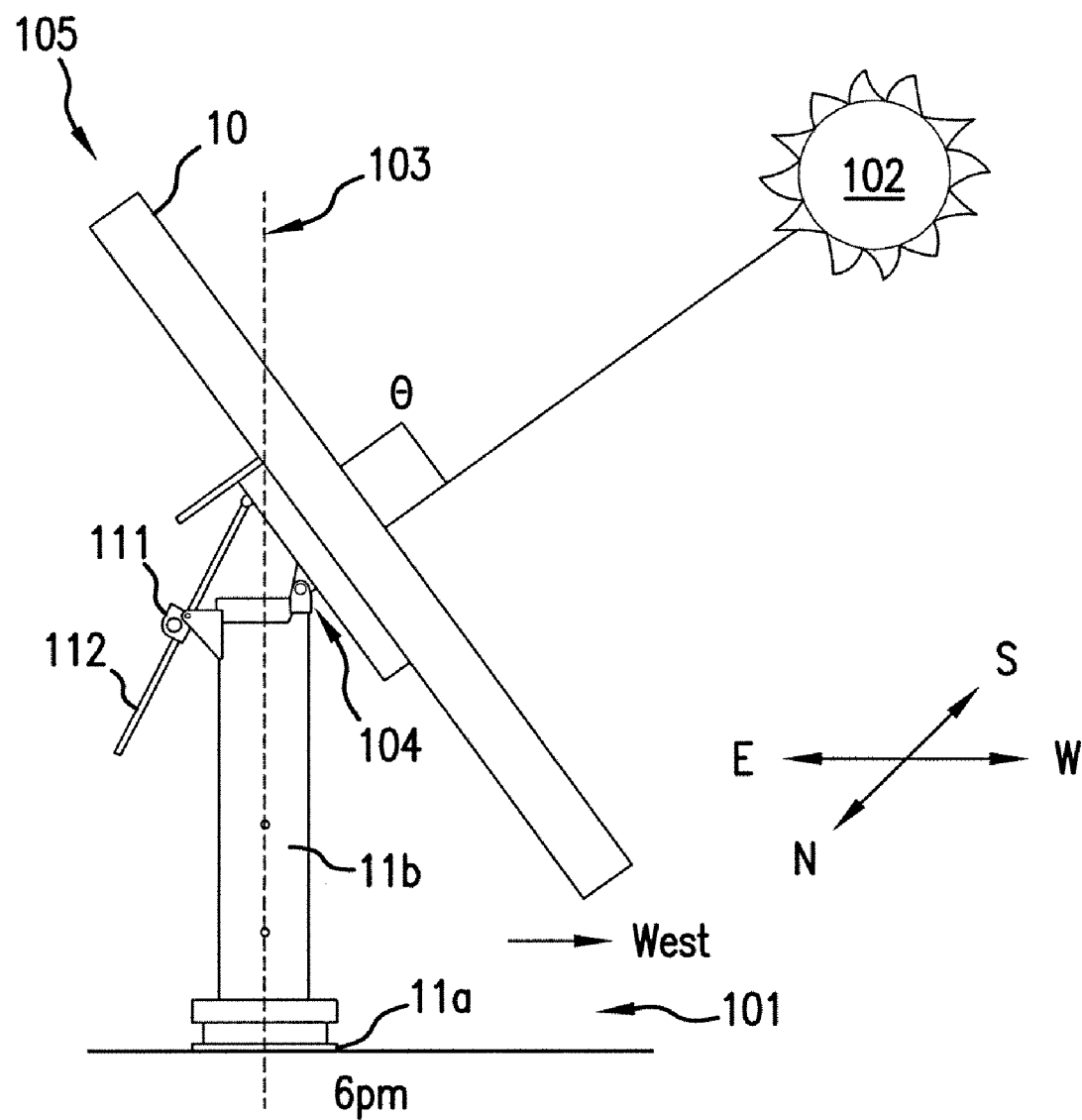

A terrestrial solar power system converts sunlight into electrical energy utilizing, e.g., multiple mounted arrays spaced in a grid over the ground. The array of solar cells has a particular optical size and is mounted for unitary movement on a cross-arm of a vertical support that tracks the sun. The array can include subarrays, sections, modules and/or panels.

The amount of power generated by the array is directly related to the amount of sunlight impinging upon the constituent solar cells. It is highly advantageous, therefore, to orient the array such that the plane of the array (of lenses and solar cells) is orthogonal to the incoming rays of the sun, and the power generation is maximized. To that end, a solar tracking mechanism is employed that ensures that the plane of concentrator lenses results in a beam projected on the center of the respective solar cells in a continuous manner as the sun traverses the sky during the day, thereby optimizing the amount of sunlight impinging upon the cells.

To stay properly aligned with the sun during solar tracking, an alignment algorithm routine is used to ensure that at any particular position the solar cell array is aligned relative to the sun. The solar cell array may perform such an algorithm manually or automatically, based on a triggering event or a predetermined time. In any instance, while the solar cell array is tracking movement of the sun, the solar cell array may additionally perform this alignment algorithm for example to optimize the position of the solar cell array as solar tracking occurs. The algorithm may move the array slowly off a current position and in multiple orthogonal directions while measuring (e.g., "scoring") the performance of the array. As the array performance drops, the algorithm uses this data to determine an aligned position to which the solar cell array should be reset for more accurate tracking of the sun. This may be achieved, for example, by slowly moving the array off its current position along a arcuate path until a predetermined drop in performance has been achieved, e.g., a 25% drop in performance. The performance drop will occur in both a positive direction and a negative direction along the path, relative to the initial value of the performance when at the initial, or neutral, position. The algorithm will thus identify both positive and negative "edges" associated for the array as it is moved and then determine an optimum point for the array based on averaging or otherwise comparing these edges. The algorithm may do a similar optimization for a second arcuate path orthogonal to the first arcuate path, for example, to produce both an optimized azimuthal position (along a first arcuate path) and an optimized elevation position (along a second arcuate path) for the array.

This alignment algorithm may be performed as an auxiliary operation of a solar tracking mechanism that optimally predicts the location of the sun at a future time, and orients the array such that it aligns with the sun at that future time. The algorithm therefore is able to add further optimization to such a routine. Performing the solar tracking process repeatedly yields the advantageous result that the array remains substantially aligned with the sun's rays. Periodically performing the algorithm aligns, i.e., corrects, the position the solar cell array during such solar tracking.

Integral to both the alignment algorithm and the solar tracking is proper control of one or more motors (or actuators) that orient the array for the desired readings. For the solar tracking in particularly, the array is not only able to predict where the sun will be, but also able to predict how to operate one or more motors (or actuators) to orient the array to meet the sun's rays at that future time. As discussed in further detail in U.S. patent application Ser. No. 12/258,253 (entitled "Solar Tracking for Terrestrial Solar Arrays," filed on Oct. 24, 2008), which is incorporated herein by reference, the solar tracking system may employ a kinematic model of the array that correlates movement of the one or more motors with the movement of the solar panel.

Solar Tracking

Before discussing the alignment process, it is worth describing solar tracking in accordance with various examples. FIGS. 1A, 1B, 1C and 1D are an illustration of a solar cell array 105 tracking the sun 102 during different times of the day. The Figures are oriented on the page so that the north direction is out of the page, south is into the page, east is to the left of the page, and west is to the right of the page. The solar cell array 105 includes a central support (11a, 11b) that is fixed to a base 101. The base 101 can be, for example, a concrete foundation on a surface of the earth. The solar cell array 105 also includes a solar panel 10. The solar panel 10 is mounted to the central support (11a, 11b) by way of a jackscrew 111, threaded rod 112 and pivot point (e.g., a hinge) 104. The solar panel includes a generally rectangular array of solar cell receivers (e.g., each receiver including a Fresnel lens and a triple junction III-V compound semiconductor solar cell).

As shown, the panel 10 is kept orthogonal to the rays of the sun 102 as the sun 102 traverses across the sky. This is accomplished by rotating the panel about two substantially perpendicular axes to account for the sun's elevation and azimuth. To adjust for the sun's azimuth, an azimuth motor causes the panel 10 to rotate about axis 103 (i.e., the longitudinal axis of the central support 11a, 11b). To adjust for the sun's elevation, an elevation motor causes the translation of the threaded rod 112 in the jackscrew 111. Because the panel 10 is coupled to the central support (11a, 11b) by a hinge 104, translation of the threaded rod 112 adjusts the angle of the panel 10 (i.e., the panel 10 rotates about the hinge 104). The angle "α" (alpha) shown in FIG. 1A is the "jack angle" which is used by the software in an embodiment of the present invention.

Figure 2:
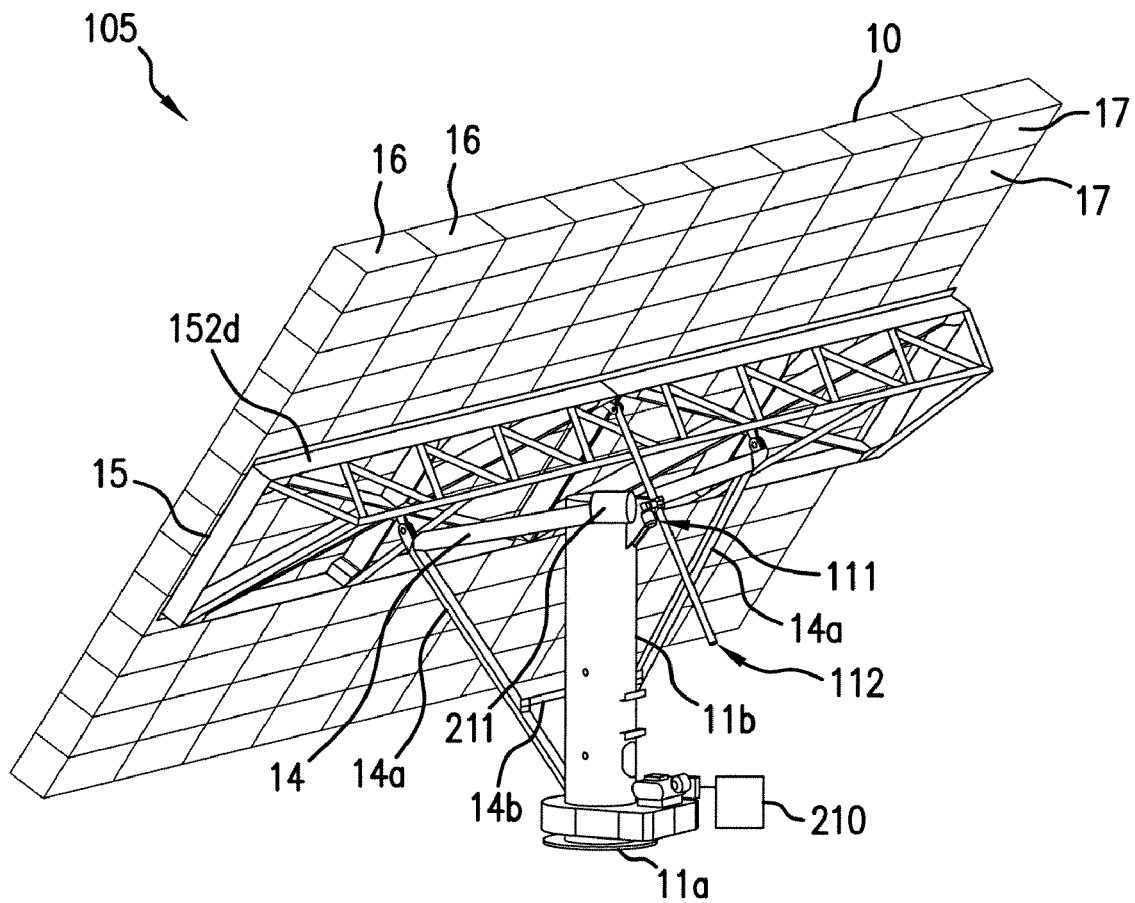
FIG. 2 illustrates further details of an example of a solar cell array.

FIG. 2 illustrates a terrestrial solar cell array 105 in greater detail. The solar cell array of FIG. 2 is described in co-owned U.S. patent application Ser. No. 12/131,556, filed Jun. 2, 2008, hereby incorporated herein by reference. In general terms, the array comprises three major components. The first major component is the central support (11a and 11b). The central support is mounted to a surface (e.g., item 101 of FIG. 1A) and is capable of rotating about its longitudinal axis. Depending on the implementation, the surface can be, e.g., the ground or a concrete foundation formed in the ground. Disposed on or adjacent to the surface is a drive mechanism 100 (e.g., azimuth motor 210 of FIG. 2) that couples to the central support. The drive mechanism 100 enables the inner member 11b to rotate relative to the outer member 11a, e.g., for moving the solar cell array such that it tracks the azimuth of the sun. The drive mechanism can include a motor along with one or more gears.

The second major component is the support frame 15. The support frame 15 couples to the central support and is adapted to support a solar panel (e.g., panel 10). The third major component is the solar panel 10. The solar panel 10 includes multiple subarrays 16 and is coupled to, and supported by, the support frame 15. The solar panel 10 converts sunlight into electricity, and normally is kept facing the sunlight by the rotation of the central support and adjustment of the jackscrew and threaded rod (111 and 112). In this implementation, each of the solar cell subarrays 16 is divided into thirteen sections 17. Each section 17 includes a 2×7 panel of concentrating lenses each lens disposed over a single receiver. The receiver, a printed circuit or subassembly, includes a single III-V compound semiconductor solar cell together with additional circuitry such as a bypass diode (not shown). In some implementations, each section 17 is a module, e.g., a discrete assembly.

In the illustrated implementation, the central support includes an outer member 11a and an inner member 11b. The outer member 11a is connectable to a support mounted on the surface by bolts. The inner member 11b is rotatably mounted within the member 11a and supports a cross member 14 which is connected to a support frame 15. The support frame 15 also is supported on the inner member 11b by a pair of inclined arms 14a which extend respectively from the support frame 15 to the base of the inner member 11b. The inclined arms 14a are coupled to each other by a cross-member 14b that increases their structural integrity. The mounting of the support frame 15 in this manner ensures that it is fixed to the inner member 11b of the central support in such a manner that it is rotatable about its central longitudinal axis through members 11a and 11b.

Jackscrew 111 and mating threaded rod 112 together can adjust the angle of the panel 10 to track the elevation of the sun. Thus, the jackscrew 111 in combination with a drive mechanism 111a (e.g., elevation motor 211 of FIG. 2) enables pivoting the support frame 15 about hinge 104, and thus the panel 10, so as to adjust its angle with respect to the earth's surface.

Figure 3:
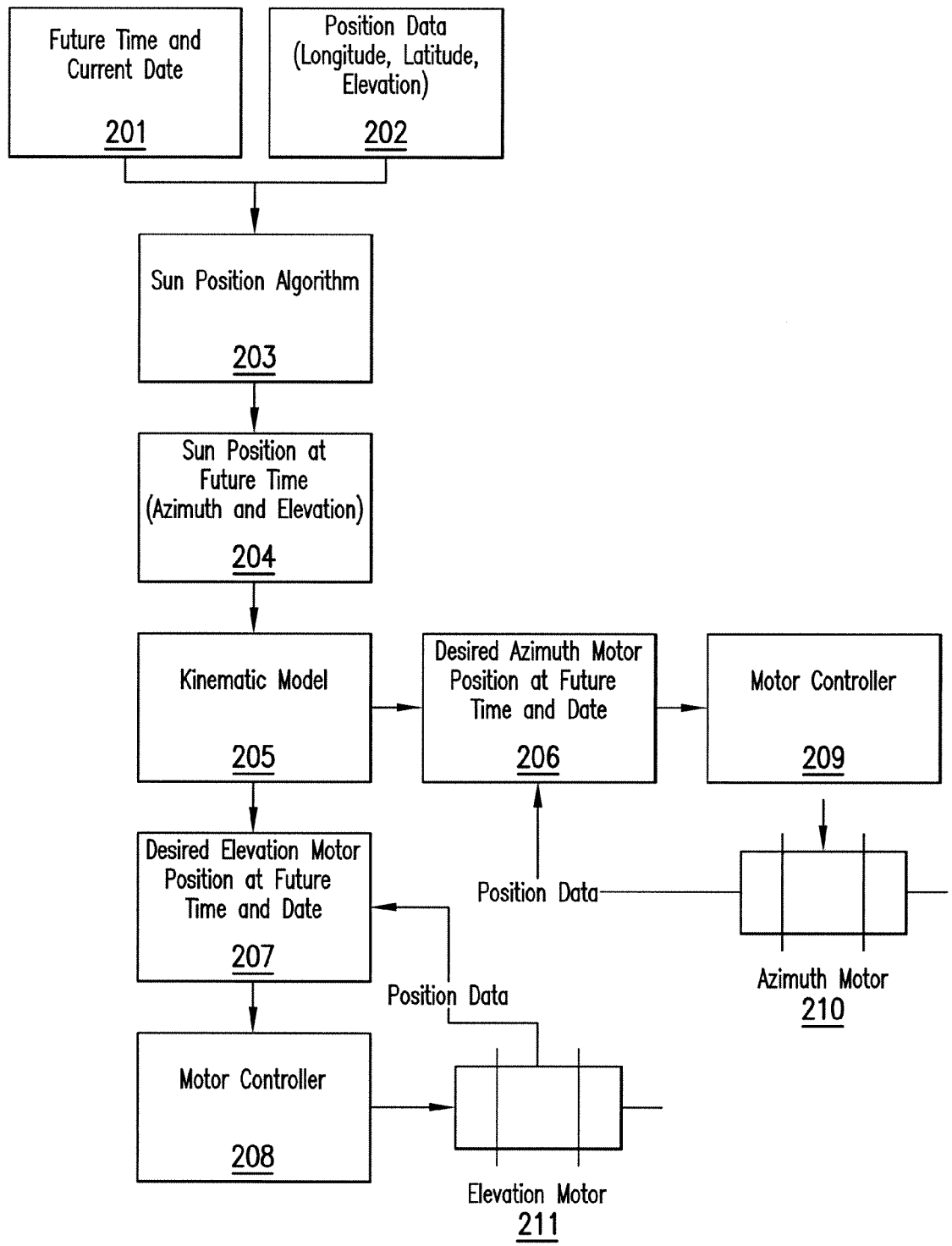
FIG. 3 is a block diagram of an implementation of a terrestrial solar tracking system.

FIG. 3 is a block diagram of an implementation of a terrestrial solar tracking system. The system receives as input data (a) the date and a future time (201) and (b) position data of the array (202), including, e.g., longitude, latitude and elevation above sea level. In this implementation, the system utilizes a future time (201) rather than the current time so that rather than lagging behind the sun, the array can be oriented to align with the sun at its expected position at the future time. In some implementations, the future time (201) is one minute into the future. In some implementations, the future time (201) can be sunrise, so that upon sunrise, the solar panel is aligned with the sun at sunrise. In other implementations, the future time (201) is at some predetermined time after sunrise that serves as a start up time corresponding to when the solar panel will begin tracking the sun. This start up future time is where the solar panel is first oriented toward the sun for tracking during the day time. While a future time associated with actual sunrise may be used, using a start up time after sunrise allows the solar panel to start tracking the sun from a tilted start up position (e.g., the position of the solar panel in FIG. 1A), instead of from a fully (or nearly) vertical position facing the sunrise on the horizon. In some examples, the start up position corresponding to this start up time may be the same as the "parked" (or storage) position of the solar panel during a night mode. For example, a start up position may be a predetermined angular position of 15 degrees, instead of 0 degrees. In any event, to maintain alignment, the system can repeat its alignment calculation periodically (e.g., every minute) or continuously.

Based on at least the input data (201, 202), the sun position algorithm (203) calculates the position of the sun (e.g., its azimuth and elevation) at that future time (204). In some implementations, the sun position algorithm (203) includes the Solar Position Algorithm (SPA) available from the National Renewable Energy Laboratory (see http://rredc.nrel.gov/solar/codesandalgorithms/spa/ and http://www.nrel.gov/docs/fy08osti/34302.pdf, both of which are incorporated herein by reference).

The sun's azimuth and elevation at the future time (204) are input data to a kinematic model (205). A kinematic model correlates movement of the azimuth motor (210) and the elevation motor (211) with movement of the solar panel (10). As such, the kinematic model (205) facilitates calculation of the appropriate actuation of the azimuth motor (206) and the elevation motor (207) so that the array (10) is aligned with the sun's elevation and azimuth at the future time (204). Each of the motors (210, 211) includes a position encoder that determines the current position of each respective motor (e.g., measured by the rotational position of the drive shaft, represented as an integral number of "counts" or increments of a predetermined numbers of degrees, starting from zero and continuing through 360 degrees for one turn, 720 degrees for two turns, etc.). For control purposes, the position data is fed back to the motor position calculation (206, 207). The position encoder may determine position based on a baseline position corresponding to a start up position of the solar panel. As described, this start up position for solar tracking may be one in which the solar panel starts tracking the sun at sunrise. However, in other implementations, this start up position corresponds to a position at a future time after sunrise, at which the solar panel is to start tracking the sun.

Motor controllers (208, 209) allow the low-power logic signals based on the algorithms to control the relatively high-power circuits of the motors (210, 211). With respect to FIG. 2, the azimuth motor 210 would be arranged to cause rotation of the panel 10 about axis 103. The elevation motor 211 would be coupled to the jackscrew 111 and threaded rod 112 so as to adjust the angle of the panel 10 (i.e., rotate the panel 10 about the hinge 104). Examples of azimuth and elevation motors are illustrated in FIG. 2 (items 210 and 211, respectively).

The data of blocks 201-207 can be stored in one or more data stores (e.g., magnetic media, solid state media, or other suitable memory structure). The processing of, e.g., blocks 203 and 205-209 can be performed by, e.g., one or more microprocessors or special or general purpose computers.

Further implementations of example solar tracking techniques are described in the incorporated U.S. patent application Ser. No. 12/258,253, and therefore will not be further provided here in detail.

Periodic Alignment Adjustment

Even for systems that are properly tracking solar movement, misalignment errors can occur. Such misalignment may result from sudden events such as wind gusts or from slowly-varying events such as degrading mechanical performance, any of which can result in errors in solar tracking. At a base level, the techniques herein address this problem by providing a way to measure an output parameter from a solar cell and analyze that measurement to determine whether the corresponding array is properly aligned or not with the sun. The output parameter can be the normal output parameter measured by the solar cell, for example, photo-current or power. Typically, arrays constantly measure such parameters, which means that the data is already ready for periodic analysis. The frequency with which the data is analyzed for alignment can vary, and can be at automatic intervals or up from automatic or manual triggering events. The techniques may be executed automatically each day, each week, each month, or seasonally. Of course, these are by way of example, as the techniques may be executed more frequently as well, for example.

As discussed further below, the system may consider numerous factors when analyzing the measured output parameter data. In fact, such factors can be used to determine when to initiate the alignment testing routine altogether, i.e., whether the output parameter data should be analyzed in the first instance. Other factors may be used to determine whether to execute alignment adjustment of the solar cell array based on the measured output parameters. For example, a decisional model may be used that analyzes power measured by the solar cell array and considers whether there has been a sudden drop in power that suggests an re-alignment is needed (such as a wind storm or ground shift) or a sudden drop that does not (such as a cloud moving between the sun and array). Other factors may include the average power measured over the day while solar tracking, historical data from previous, similar tracking periods (e.g., the day before, a similar day the year before, etc.). In any event, the decision model may consider all such relevant factors in determining whether to actually analyze the measured parameter and determine whether a measured value suggests that alignment is needed or does not.

After going through this decision process, the techniques herein then involve moving the array until an aligned positioned is found. More specifically, the array may be swept across one or more paths to identify an aligned position. That aligned position may be where the maximum output parameter measure occurs, and thus considered an optimum position; although in other examples the aligned position may be a less than optimum position. The aligned position is determined by comparing measured output parameter values that occur during sweep movement. In performing that comparison, in some examples, a decisional model considers whether the compared data will produce accurate alignment position data. For example, when there is a small cloud immediately in between the solar cell and the sun, the decisional model operating during sweep may determine than an increase in measured output parameter may not be due to the array being moved into a more correctly-aligned position relative to the sun, but simply that the array has been moved to point in a direction of the sky that results in more solar energy hitting the array directly and without passing through the attenuated energy passing directly through the clouds. In such an example, although the array may measure a higher power while sweeping, the initial position, blocked by the clouds, may be the actual aligned position. The decision model may thus compare measured output parameter data against other measured data on an accumulated basis (e.g., comparison to a running average) or using other data analysis tools to assess whether data measured during a sweep of the array is useful in determining proper alignment or not.

In some examples herein, motors and actuators are used to sweep the array about a neutral position across specific azimuth and elevation paths to identify the actual aligned array position. However, the techniques herein are not limited to arrays with particular motor/actuator configurations, nor are the techniques dependent upon sweeping about a neutral position. Systems capable of sweeping an array either across large sweep angles (>10%) or small sweep angles (<10%) are suitable. Furthermore the amount of sweep that the array is required to cover may be time dependent and seasonally dependent. The techniques will be configured such that a sweep angle used during the morning is different than the sweep angle used in the evening, although in both instances the sweep angle is looking for the same drop off in the output parameter as indicating that the array needs to be re-aligned.

Some specific examples are provided by way of example.

Figure 4:
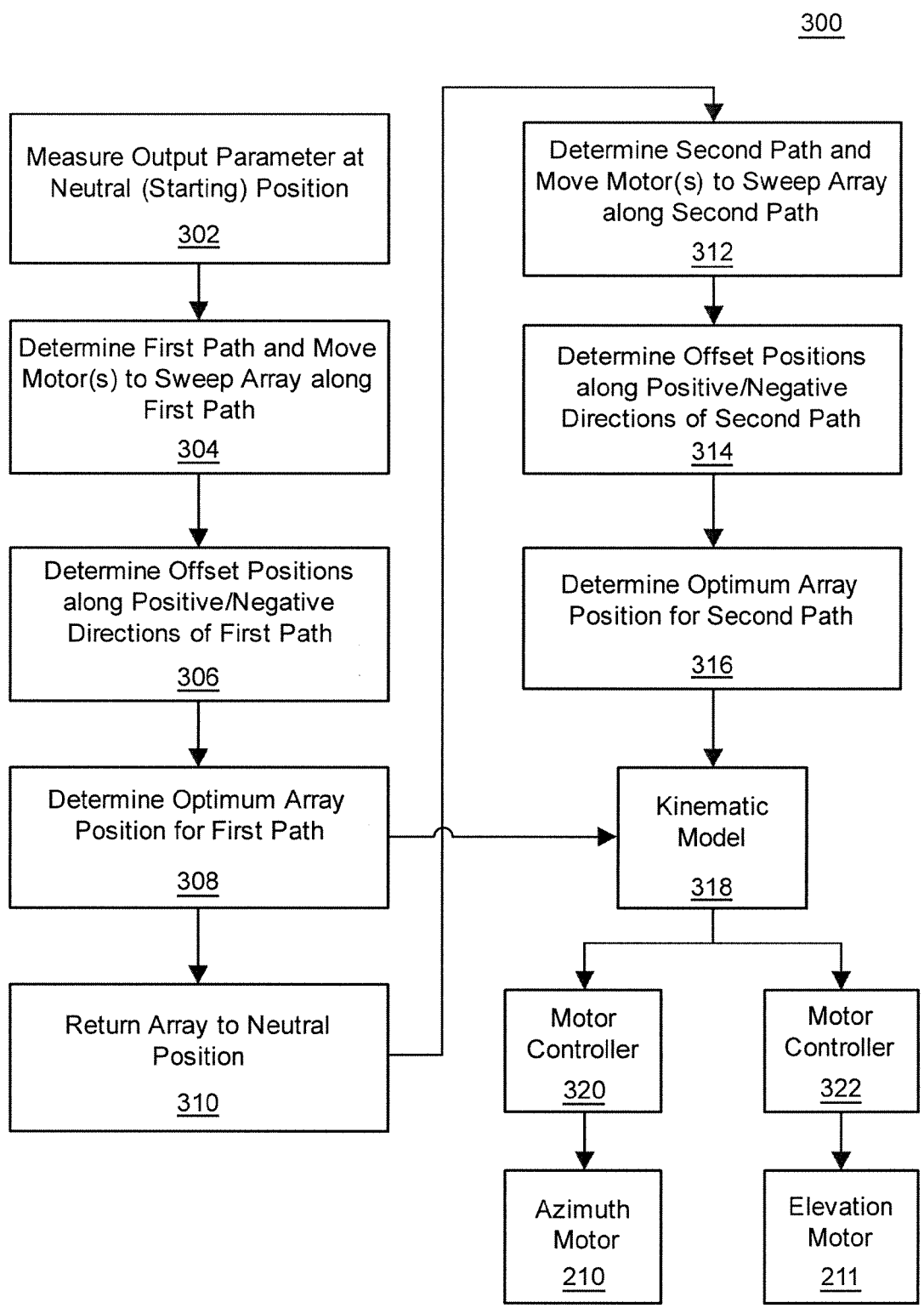
FIG. 4 is a block diagram of an implementation of an alignment algorithm routine.

FIG. 4 illustrates an implementation 300 of a method for optimizing the position of a solar cell array, using a "find sun" routine as the alignment algorithm. The algorithm is termed a find sun routine, because it is designed to align the array by identifying an optimum point of the solar cell array relative to the sun. The alignment algorithms could just as easily identify a less than optimum position instead. The alignment algorithm can be executed manually by operator initiation or automatically, such as at predetermined intervals or at specifically determined events such as at start up. As discussed herein, other triggering events include a sudden decrease in a measured output parameter, which may indicate that the solar tracking routine is not aligned, or more slowly varying errors such as currently measured output parameters that are smaller in value than previous measurements from the same measurement period. Here for example, values can be compared to previous values within an identified time window, values measured in previous days, weeks, months, etc. In any event, measured output parameter data is analyzed to determine if unexpected or undesired drops in output values have been recorded.

In addition to triggering based on sudden decreases, the routine 300 may be triggered by accumulated decreases over time, such as a continuous unexplained decrease in output power. Such decreases can occur due to defects in mechanical elements of the solar cell array, including gradual twisting and bending of mechanical support members or actuators. Such decreases can also result from shifting in the foundation or support of the solar cell array. Concrete supports, for example, can be particularly susceptible to gradual settling and/or shifting of the earth below. Any of these may introduce a gradual error in solar tracking. The routine 300 may therefore be triggered by a decisional model that measures for such gradual changes over time. The triggering can be threshold-based, and thus absolute. However, in many applications, these types of changes are so small that differential changes in measured output parameters will have to be monitored over long periods of time and analyzed for example through regression or other modalities to assess when the routine should be executed. In some such examples, external sensors could be used to further trigger the alignment algorithm. These include pressure sensors in the support or foundation of a solar cell array, line of sight proximity switches used to identify misalignment, etc. Beyond these, of course, one advantage of the present techniques is that executing an alignment routine on a continuous basis will inherently compensate for such slowly varying decreases in optimum measurement, as will executing the routine with a high enough periodicity.

Another small decrease in output parameter that accumulates over time is due to seasonal variations. Because the solar cell array must be angled differently during different seasons—the sun's position in the sky is higher in the summer than in the winter for example—the mechanical movement and responsiveness of the array can be different at different times of year. Changes in sun elevation can be the biggest culprit in producing seasonal-dependent bending or sagging in the mechanical elements of the solar cell array. For example, during the summer when the array is in a more horizontal, elevation position, the array may sag and bend more during movement, than when the panel is more vertical, as occurs in the winter. In any event, the alignment algorithms described herein may be triggered based on such seasonal changes, either as a result of measured vales (output parameter, external sensors, etc.) as discussed above or as a result of triggering based on the time of year automatically programmed into a controller executing the routine.

For the routine 300, first, a block 302 measures an initial value of an output parameter for the solar cell array 10 at an initial position of the solar cell array, also termed a neutral position. If the routine 300 is executed during solar tracking, such as that described with reference to FIG. 2, then this neutral position may be a presumed optimum position relative to the sun, i.e., the solar cell array is presumed to be orthogonal to the incoming rays of the sun, and the output parameter measurements are maximized. Due to misalignment, poor tracking, degrading equipment, etc., this presumed optimum position may in fact not be the optimum position. In other examples, the neutral position may be the position of the solar cell array at start-up, before solar tracking has begun. In any event, the initial measurement of the output parameter is used as a baseline for assessing whether the current position of the solar cell panel is the optimum position.

Figure 5A:
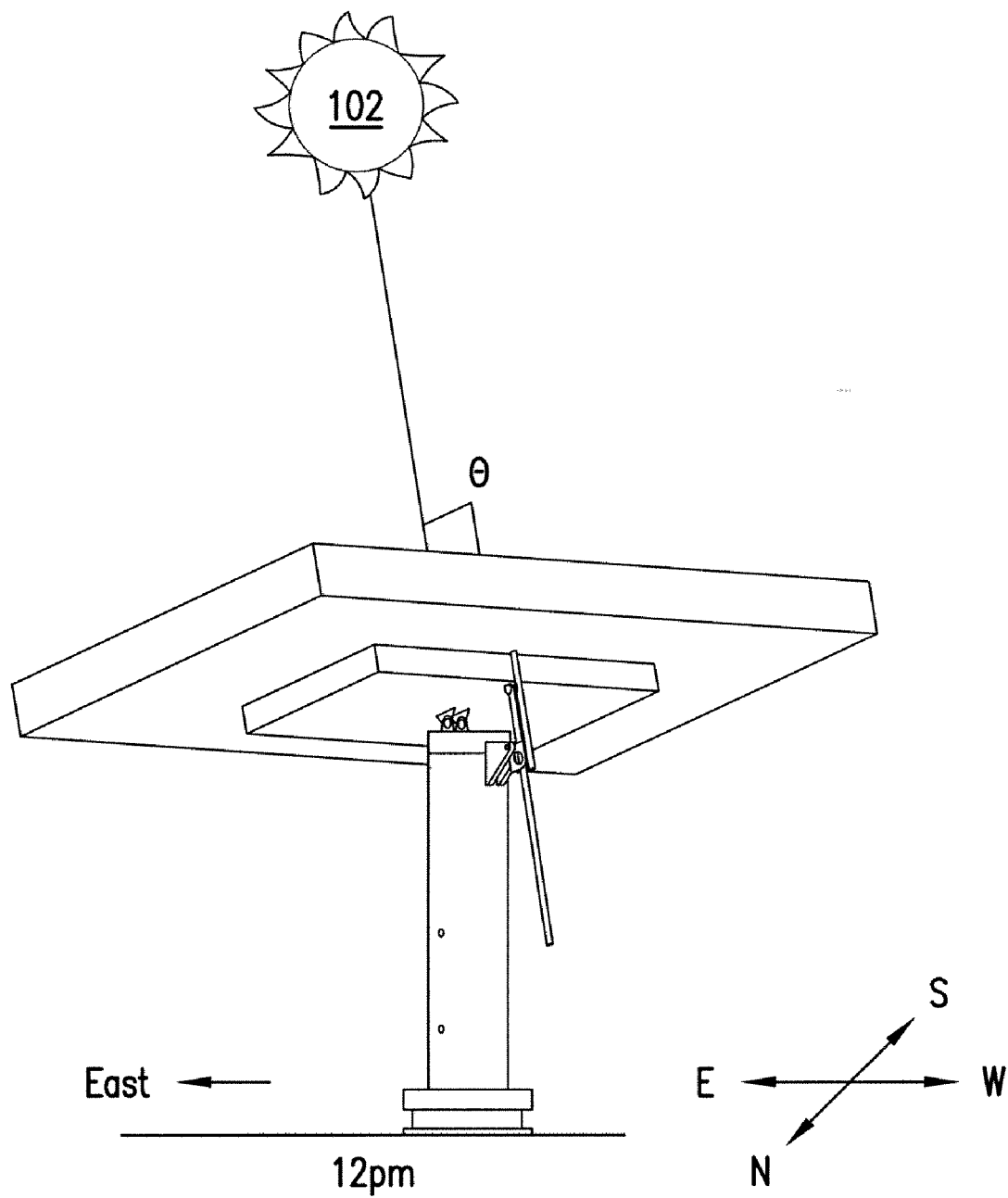
FIGS. 5A, 5B and 5C are an illustration of a solar cell array in a first neutral position, a first offset position in a positive direction of an azimuthal sweep, and a second offset position in a negative direction of the azimuthal sweep.
Figure 5B:
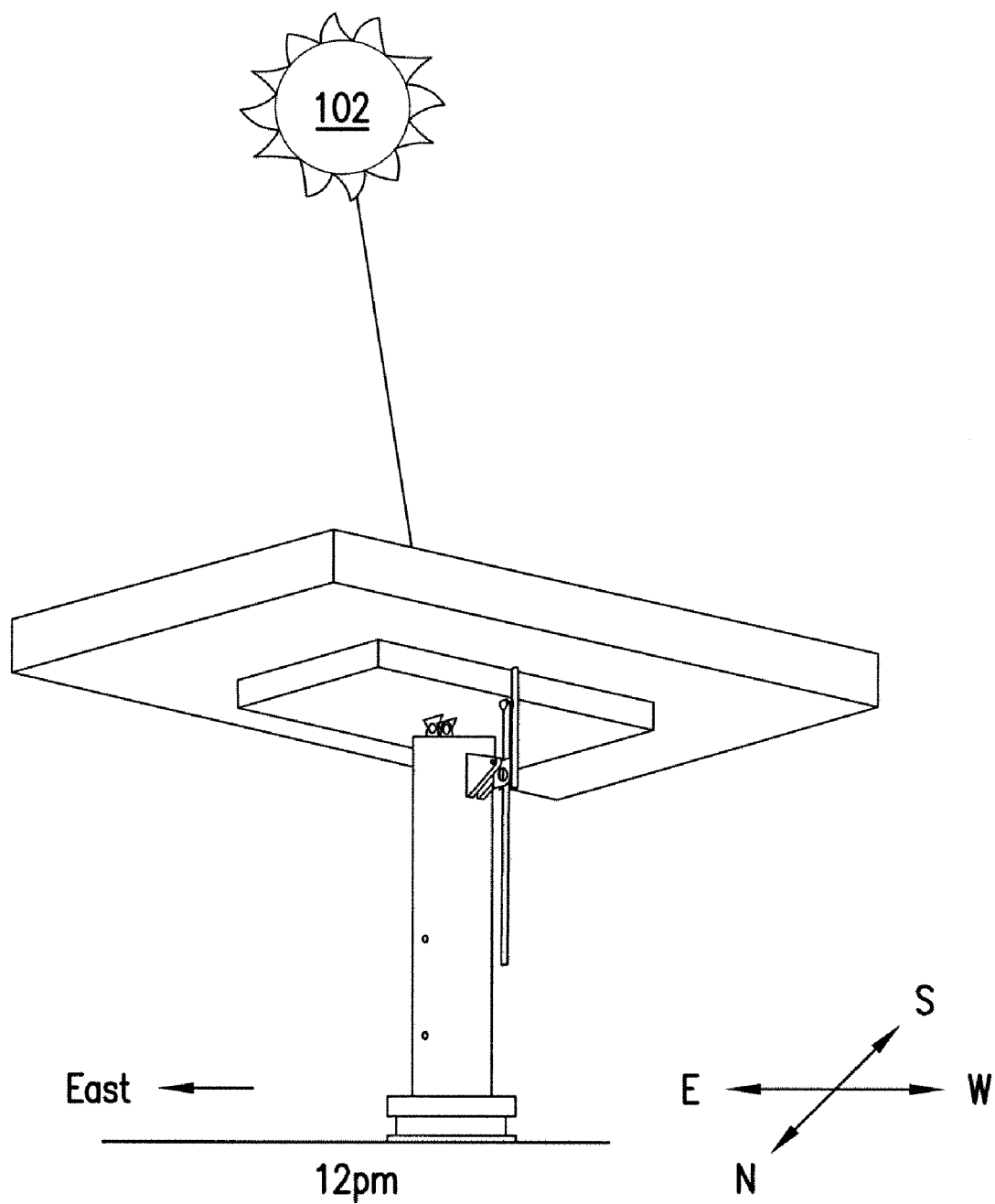
Figure 5C:
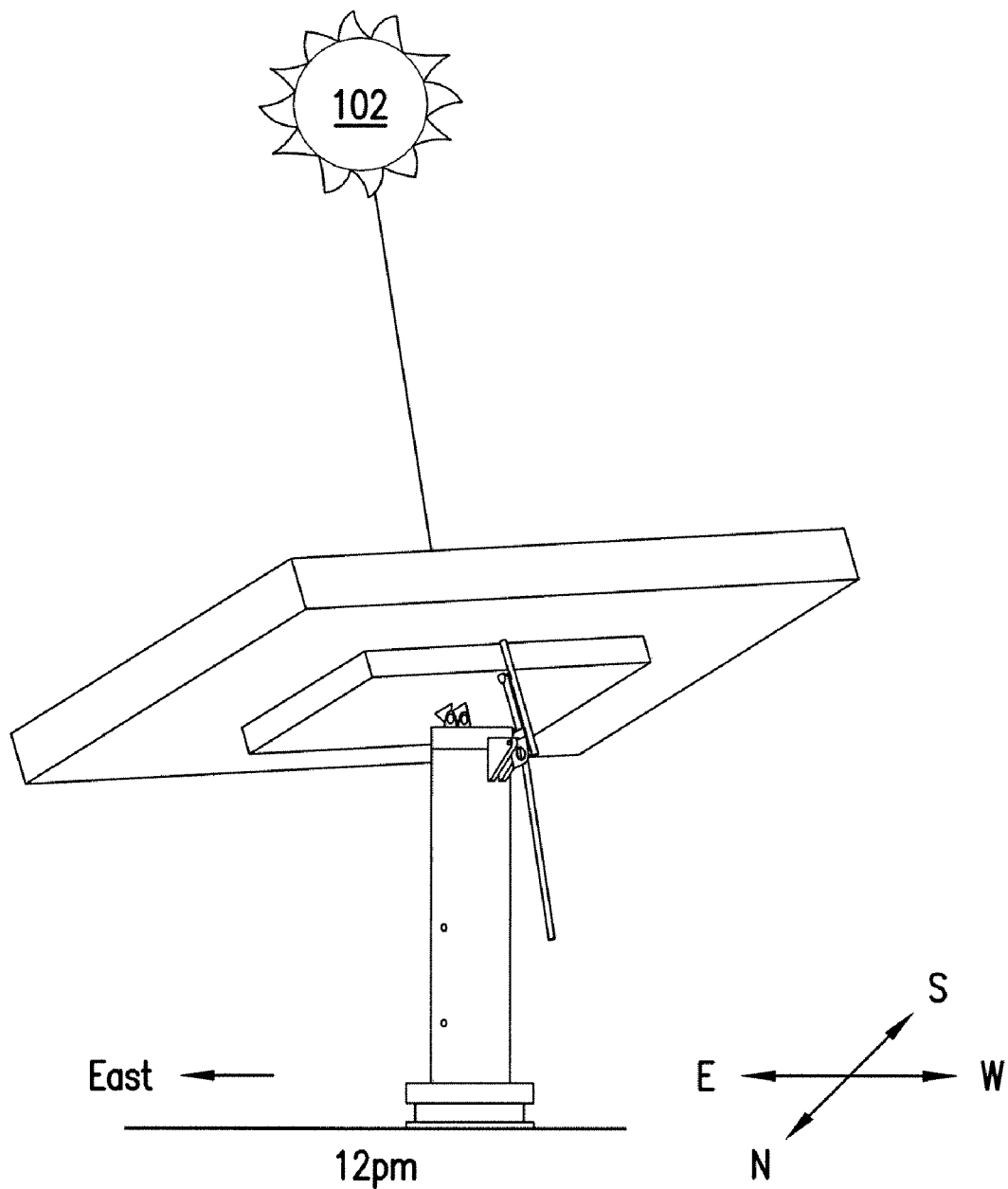

To assess the optimum position, the routine 300 makes relatively small changes to the position of the array along orthogonal directions and compares the resulting measurements for identifying a new optimum position. To that end, a block 304 moves the solar cell array 10 along a first path from the neutral position and a block 306 determines first and second offset positions along that first path, where these positions correspond to positions of the array at which the measured output parameter is at a predetermined level. For example, to move the array 10 along an arcuate, azimuthal path, the block 304 would control motor 210 (FIG. 2) to move the array 10 across a 3 degree sweep from the neutral position. The use of 3 degrees is provided by way of example; the actual sweep could be larger or smaller and preferably depends on a predetermined amount of the output parameter measured at the neutral position or other presumed maximum position. Referring to FIGS. 5A-5C, for example, FIG. 5A illustrates the solar panel 10 in a neutral position, FIG. 5B illustrates the solar panel 10 after the block 304 has moved the solar panel in a positive azimuthal direction relative to the neutral position, and FIG. 5C illustrates the solar panel 10 after the block 304 has moved the solar panel in a negative azimuthal direction relative to the neutral position. As the block 304 moves the solar panel array 10, the block 306 measures the output parameter. The output parameter may be current or power measured by the cells of the array, or any other metric by which the accuracy of the array's position relative to the sun can be determined. The block 306 may continuously or periodically measure this output parameter. The block 306 compares the measured output parameter to the initial output parameter and instructs the solar cell array motor(s) controlled by block 304 to stop when a predetermined value is determined. For example, with power as the output parameter, the array 10 may move until the measured power along the azimuthal power has dropped by 20% or more (e.g., by 25% of the initial measured output parameter) from that of the initial measured value (FIG. 5A). The position of the array at which point the power has dropped by this predetermined amount is determined to be an offset. A first offset occurs when the power has dropped by this amount in the positive direction; and a second offset occurs when the power has dropped by this amount in the negative direction.

Generally speaking, the sweep distance in each direction along the azimuthal path will be about 3 degrees in total. Because the array 10 may not be at a position resulting in maximum power when the routine 300 is executed, it is likely that the block 306 will measure an increase in the power while the array 10 is sweeping to either the positive direction (FIG. 5B) or the negative direction (FIG. 5C). A solar cell array having a neutral position that is in fact an optimum position will lose about 25% of its power when the array is offset from the sun by 1 degree. Therefore, considering that the array will likely not be at such an optimum position initially, a 3 degree sweep distance is used.

The sweep time is controlled by the block 304. In an example, a sweep time of 120 seconds was used, although any suitable sweep time may be used. Using long sweep times may not be desired as they may increase the likelihood that the clouds or overcast conditions will skew the output parameter measurement. Using very short sweep times may cause the transition in output power to happen too quickly for the granularity of measurement and motor control. In any event, the sweeping from the blocks 304 and 306 used for the find sun routine typically occurs simultaneously with the normal solar tracking movement of the array. Therefore, the sweep time used should be balanced against that continual movement of the solar cell array 10.

Figure 6A:
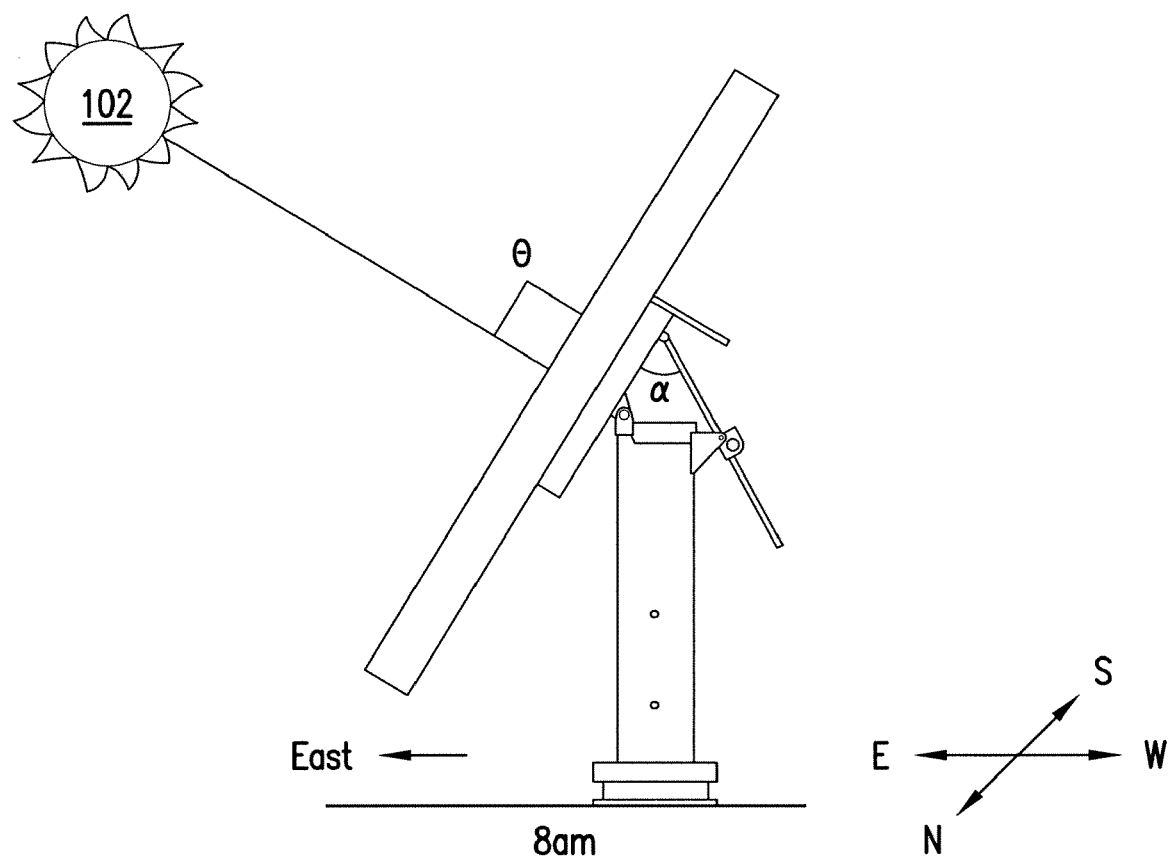
FIGS. 6A, 6B and 6C are an illustration of a solar cell array in a second neutral position, a third offset position in a positive direction of an elevational sweep, and a fourth offset position in a negative direction of the elevational sweep.

A block 308 compares the first offset position and the second offset position data from the block 306 and determines an optimum azimuthal position for the array 10. For example, the block 308 may average the first and second offset positions and identify the optimum position as a point direction in the middle between those two edge positions. This optimum position data is then stored, and a block 310 moves the array 10 back to the neutral position (FIG. 6A). This neutral position may be the static neutral position of FIG. 5A, i.e., when the azimuthal optimization occurred. However, in other examples, this neutral position may be only an elevational neutral position or a neutral position at a future point in time from that of FIG. 5A, for example, when the array is also continually moving as part of a solar tracking function. In some examples, the block 308 provides additional decisional model functions that determine whether or not to compare the first and second offset data in the first place, for example, by analyzing the measured output parameter data to assess whether the data indicates misalignment in fact or whether the data indicates another phenomena is at play, such a small cloud blocking the sun.

Figure 6B:
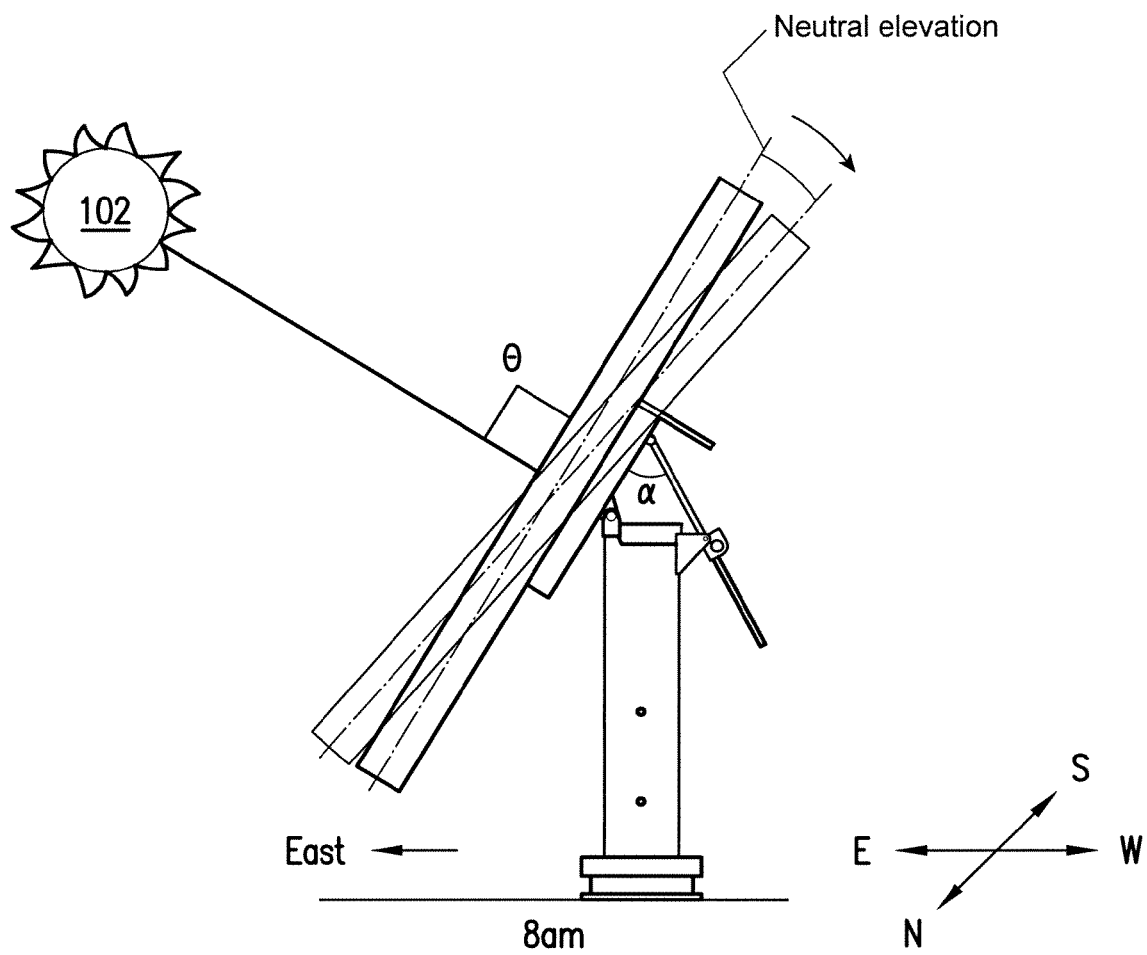
Figure 6C:
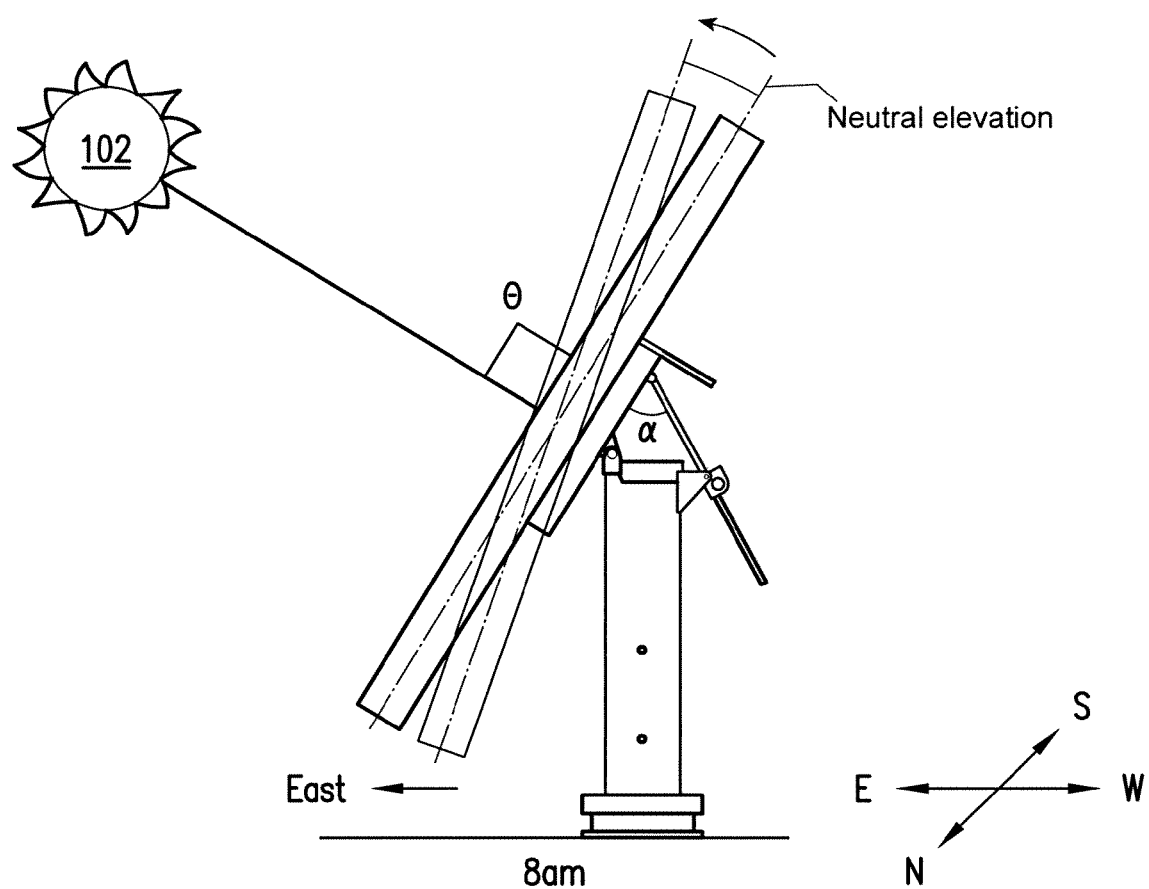

With the optimum position determined along one path, a block 312 determines a second path, preferably orthogonal to the first path such as an elevation path. The block 312 actuates the motor(s) to move the solar cell array 10 from the neutral position of block 310 along this second path. That is, the block 312 moves the array in a positive elevation direction (FIG. 6B) and a negative elevation direction (FIG. 6C) relative to the neutral position (FIG. 6A). Block 314, similar to block 306, determines the (now) third and fourth offset positions associated with predetermined changes in the measured output parameter along the elevation path. Block 316 then determines an optimum elevation position for the array 10, for example, by averaging the third and fourth offset positions.

The optimum position data from the blocks 308 and 316 is provided to a kinematic model 318 which, as part of the decisional model, determines the new azimuth motor position and the new elevation motor position for optimum positioning of the array 10 relative to the sun. The kinematic model 318 may be similar to that describe in U.S. patent application Ser. No. 12/258,253, in that the kinematic model may receive a number of input data from which motor control data is determined. This includes combining future time data used in solar tracking with the determined optimum position data from the find sun routine, so that the kinematic model 318 will produce motor control data that seeks to optimize the position of the array 10 at some future time. In this way, the find sun routine may be used to optimize solar tracking in real time, i.e., while solar tracking continuously occurs. Like with the solar tracking model of FIG. 3, the kinematic model 318 provides its motor control data to an azimuth motor controller 320 and an elevation motor controller 322, for controlling motors 210 and 211, respectively.

As the array 10 is sweeping across a path, the find sun routine 300 may measure an output parameter value that is higher than the initial value measured at the neutral position. Therefore, in some examples, the blocks 306 and 316 measure the output parameter when that measurement produces a value larger than the initial measurement, the blocks 306 and 316 will assign that new value and corresponding position as the new presumed maximum value of the output parameter. Therefore, in determining the offset positions, the blocks 306 and 316 will identify those positions at which the array 10 is at a predetermined amount, not of the initial measured value, but of the newly measured maximum value.

Figure 7:
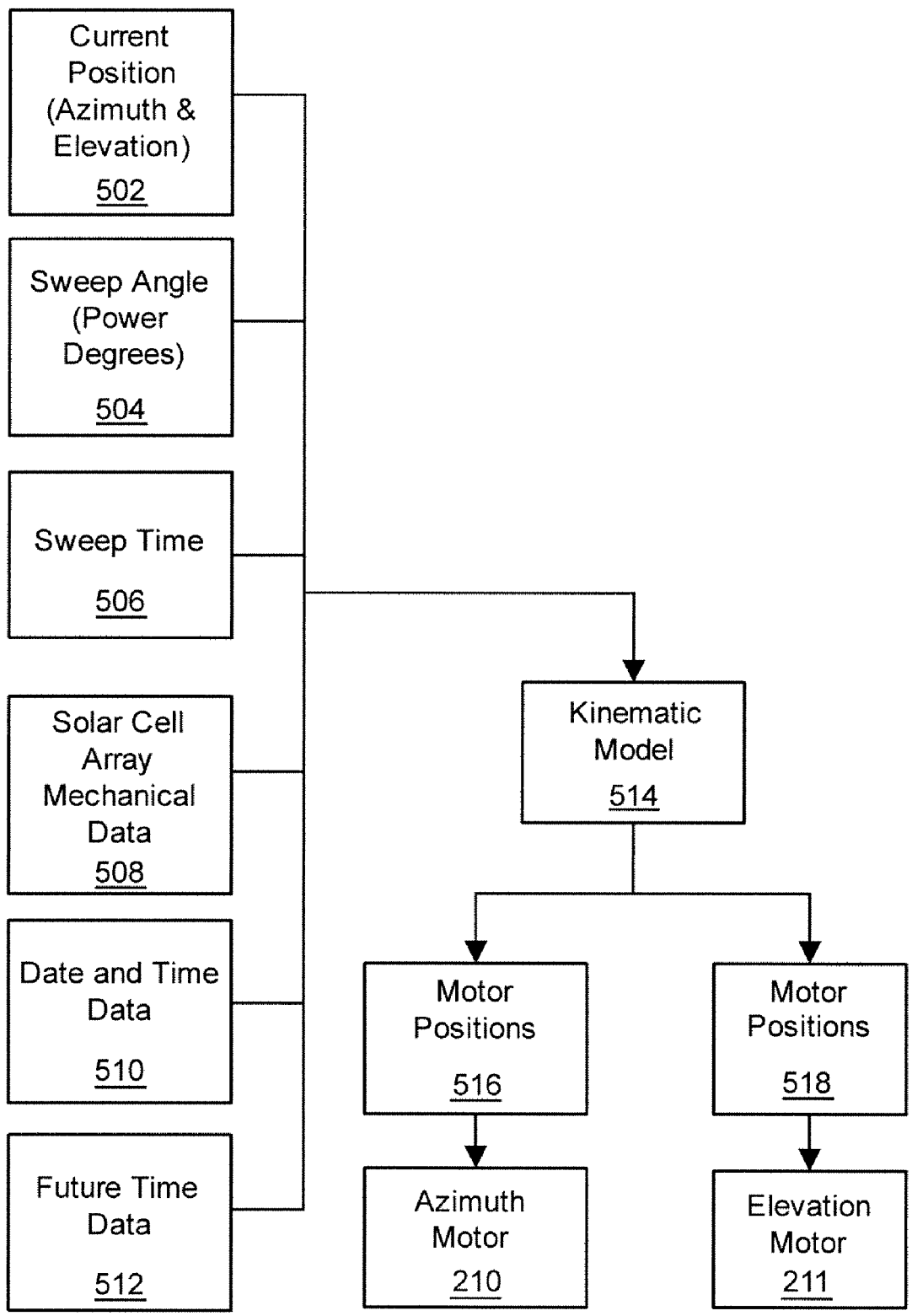
FIG. 7 is block diagram of an implementation of kinematic model for performing an alignment algorithm routine for a terrestrial solar cell array.

An example implementation of the block 304 is illustrated in FIG. 7, with the understanding that the block 312 would operate in a similar manner. As discussed, the block 304 sweeps the solar cell array 10 along an azimuthal path, by controlling actuation of one or both of the motors 210 and 211. In the discussed example, only the motor 210 is needed to move the array in an azimuthal path under ordinary conditions. To perform this sweep, the block 304 receives several parameters as input data and supplies them to a kinematic model. Some examples are shown in FIG. 7 as blocks 502-512. Generally speaking, while more parameters can provide a more accurate kinematic model, all of blocks 502-512 are not required to achieve a functional kinematic model. In fact, since the block 304 can be tailored for a particular array, entirely different parameters can be used in some implementations. Each of the parameters are fed into a kinematic model 514 which produces motor position controls 516 and 518 for each of the azimuth and elevation motors 210 and 211, respectively.

Some parameters are directed to the particular mechanical characteristics of the solar cell array. A first parameter (502) describes the current azimuth and elevation position of the motors and thus of the solar cell array itself. The desired sweep angle for an arcuate path is provided by block 504. This data may include the predetermine amount of drop off in output parameter that is to be used to determine the amount of sweep (e.g., 25% drop in power). This data may further include (or alternatively contain) the maximum sweep range in degrees (e.g., approximately 3 degrees in each positive and negative direction from a neutral position). The sweep time (506) is provided and sets the rate at which the array is swept. Date and time data (508) is provided and used by the kinematic model 514 to normalize the sweep angle data (504). This is useful for example as seasons change, where in the summer when the sun is high in the sky, the array 10 may need to move more than 3 degrees of Azimuth rotation to get 3 degrees of off-sun movement. Appropriate normalization and standardization of the control allows the kinematic model 514 to correlate the desired sweep angle with the requisite actuations to control the motors on the array 10. Future time data (510) reflecting the desired azimuth motor position at a future time and the desired elevation motor position at a future time are also provided to the kinematic model 514. Such data results from the solar tracking routine, such as that of FIG. 3, may be used to control motor actuation for the find sun routine while the array is also simultaneously tracking the sun.

The remaining data is generally categorized as mechanical data for the solar cell array (512) and generally includes data such as jackscrew pitch data, gear ratios for elevation and azimuth motors, jackscrew data such as length and position of the rod and angle between the rod and the solar panel, the home positions for the azimuth and elevation motors, elevation rotation angle indicating variances in construction resulting in an elevation axis that is not fully perpendicular to the azimuth axis, bent array angle data indicating variances in construction resulting in the plane of the solar panel not be perpendicular to the elevation hinge, a zero jack angle parameter indicating the elevation angle of the solar panel when the jackscrew angle is zero, and azimuth and elevation motor home positions. These are other potentially useful data are described in further detail in U.S. patent application Ser. No. 12/258,253.

It will be understood that these parameters are provided for example purposes and are not meant to be complete or exhaustive or even required. Furthermore while the block 304 is described as having its own kinematic model 514, in other examples the block 304 may be implemented by the same system implementing the solar tracking of FIG. 2 thus using a single kinematic model able to control both solar tracking and separately control the off-sun movement for the find sun routine.

The data of blocks 502-512 can be stored in one or more data stores (e.g., magnetic media, solid state media, or other suitable memory structure). The processing of, e.g., block 514 can be performed by, e.g., one or more microprocessors or special or general purpose computers.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

A number of implementations have been described. Nevertheless, it will be understood that various modifications may be made without departing from the spirit and scope of the invention. Accordingly, other embodiments are within the scope of the claims.

What is claimed is:

1. A method of adjusting a photovoltaic solar cell array of a terrestrial solar cell system that tracks the sun, the system comprising two motors each of which is operable to adjust a position of the array along a different respective axis with respect to the sun, the method comprising:
   (a) using a software algorithm to predict a position of the sun during the course of the day based, at least in part, on latitude, longitude and elevation;
   (b) using a computer model to determine respective actuations for the motors corresponding to the solar cell array being substantially aligned with the sun during the course of the day, based upon the software algorithm in step (a); and
   (c) actuating the motors so that the solar cell array is positioned in accordance with the software algorithm;
   (d) at predetermined times measuring an output parameter of the solar cell array, and adjusting the position of the solar cell array so that the solar cell array is more accurately aligned with the sun than as determined in step (c).

2. The method of claim 1, further comprising initiating operation of the motors so that at a predetermined time the output parameter of the solar cell array is measured, the solar cell array is moved to a first offset position such that the measured output parameter of the solar cell array has decreased by a predetermined percentage of a predetermined amount of the output parameter.

3. The method of claim 2, further comprising moving the solar cell array along a first path of movement to a second offset position, such that the measured output parameter of the solar cell array has decreased by the predetermined percentage of a predetermined amount of the output parameter.

4. The method of claim 3, further comprising using the software algorithm to determine an aligned position for the solar cell array along the first path based on the first offset position and the second offset position.

5. The method of claim 3, further comprising initiating operation of the motors so that at a predetermined time the output parameter of the solar cell array is measured, the solar cell array is moved to a third offset position such that the measured output parameter of the solar cell array has decreased by a predetermined percentage of a predetermined amount of the output parameter.

6. The method of claim 5, further comprising moving the solar cell array along a second path of movement to a fourth offset position, such that the measured output parameter of the solar cell array has decreased by the predetermined percentage of a predetermined amount of the output parameter.

7. The method of claim 6, further comprising using the software algorithm to determine an aligned position for the solar cell array along the second path based on the third offset position and the fourth offset position.

8. The method of claim 6, wherein the first path is either an azimuth path or an elevation path and the second path is the other of either the azimuth path or the elevation path.

9. The method of claim 6, wherein the first path and the second path are orthogonal to one another.

10. The method of claim 6, further comprising using the software algorithm to average the first offset position and the second offset position to determine the aligned position in the first path and to average the third offset position and the fourth offset position to determine the aligned position in the second path.

11. The method of claim 2, further comprising:
analyzing the measured output parameter at the predetermined time to determine whether the measured output parameter indicates a possible misalignment of the solar cell array; and
in response to the analysis moving the solar cell array to the first offset position.

12. The method of claim 1, wherein the output parameter is a power.

13. The method of claim 1, wherein the output parameter is current.

14. The method of claim 1, further comprising automatically performing (a)-(d) at periodic intervals.

15. The method of claim 1, further comprising automatically performing (a)-(d) while simultaneously, separately tracking a position of the sun.

16. The method of claim 1, further comprising manually initiating performance of (a)-(d)

* * * * *